(12) United States Patent
Al-Harbi

(10) Patent No.: US 7,970,715 B2
(45) Date of Patent: Jun. 28, 2011

(54) SYSTEM AND METHOD FOR MONITORING AND CONTROLLING WATER DISTRIBUTION

(76) Inventor: Hamad S. H. Al-Harbi, Surra (KW)

(*) Notice: Subject to any disclaimer, the term of this patent is extended or adjusted under 35 U.S.C. 154(b) by 455 days.

(21) Appl. No.: 12/132,830

(22) Filed: Jun. 4, 2008

(65) Prior Publication Data

US 2009/0307116 A1 Dec. 10, 2009

(51) Int. Cl.
*G06F 17/00* (2006.01)
(52) U.S. Cl. ........................... 705/412; 705/413
(58) Field of Classification Search ........... 705/412–413
See application file for complete search history.

(56) References Cited

U.S. PATENT DOCUMENTS

| 4,777,354 | A | * | 10/1988 | Thomas | 235/380 |
|---|---|---|---|---|---|
| 6,088,659 | A | * | 7/2000 | Kelley et al. | 702/62 |
| 6,243,693 | B1 | * | 6/2001 | Richards | 705/412 |
| 6,444,172 | B2 | * | 9/2002 | Fukunaga et al. | 422/68.1 |
| 7,379,997 | B2 | * | 5/2008 | Ehlers et al. | 709/224 |
| 2003/0167178 | A1 | * | 9/2003 | Jarman et al. | 705/1 |

* cited by examiner

*Primary Examiner* — Ramsey Refai
(74) *Attorney, Agent, or Firm* — Lowe Hauptman Ham & Berner, LLP

(57) ABSTRACT

An electronic system for maintaining and controlling the use of water includes a control valve, an electronic water counter and a central computer connected to the water counter by wire, internet or wireless for opening and closing a control valve during pre-selected periods or in the event of excess usage. The system is also capable of providing water at an increased charge and subject to modification by a Smart Card.

7 Claims, 4 Drawing Sheets

SYSTEM AND METHOD FOR MONITORING AND CONTROLLING WATER DISTRIBUTION

FIELD OF THE INVENTION

This invention relates to a system and method for monitoring and controlling water distribution in order to optimize water use and more particularly to a system and method for monitoring and controlling distribution based on at least one of the following: a.) requested amount of water, b.) history of previous use, c.) time of day, d.) data on a smart card.

BACKGROUND FOR THE INVENTION

In many areas of the world there is a shortage of water and as populations increase this shortage becomes more critical. In some areas the natural water supply is augmented by desalination. However, potable water produced by desalination is relatively expensive. In addition in many such areas, the construction of desalination plants has lagged behind increasing populations. As a result of the above, a number of areas of the world are confronted with a serious problem and are considering rationing and/or control of water usage as one approach for overcoming the problem and/or at least temporarily reducing the seriousness of the problem. In some case, the problem of water shortage is exacerbated during periods of peak usage such as those times when a company that uses large quantities of water is operating, as for example during their normal business hours. It is also common for restaurants to use large quantities of water during lunch and dinner hours and for individuals to use dishwashers, washing machines and the like or hand use of water during various times of day.

The criticality of water shortage has become more acute in recent years and there have been numerous approaches for overcoming the problem. For example, a United States Patent Application Publication No. 2004/0206405A1 of Smith et al. discloses a residential water management system (RWMS). As disclosed therein, a complete water management system was developed into a single programmable electronic controller specifically designed to both aid in water conservation and provide full control and monitoring of all aspects of a plumbing system including water usage, counting, flow control, leak detection, water heater on/off, hot water temperature and irrigation sprinkler systems. A device which allows the user to monitor control purge and adjust the entirety of a plumbing system applies the principle increased pressure I I S=decreased flow . . . therefore "stable pressure is also equal to the absence of flow" . . . to facilitate a completely accurate method of leak detection in plumbing. A device which provides property damage prevention and reduced opportunity for toxic mold development results in a healthier environment.

A further approach to water management is disclosed in a U.S. Patent Application Publication No. 2006/0122736A1 of Alexanian, entitled "Irrigation Controller Water Management with Temperature Budgeting". The Alexanian application discloses a method for water conservation with AC, DC or ambient light powered irrigation controllers without the use of complex ET (Evapotranspiration) data or ET related service fees. Programming may consist of the operator entering a preliminary irrigation schedule and entering the local zip code. The controller then periodically calculates a water budget by comparing current non (ET) local geo-environmental data with stored local geo-environmental data and then modifies the preliminary schedule using the water budget. A number of embodiments were reported in stand-alone controllers with a temperature sensor attached directly to the microprocessor within that controller or as a centrally placed central broadcast module which circulates a water budget percentage which is transmitted to one or more field controllers by wired or wireless means. Alternatively, a temperature budget module that is separate from the controller is connected between the controllers outputs and the valves are mounted at the valves themselves. The temperature budget module calculates the water budget, monitors the controller outputs and shortens the duration times as calculated by the water budget ratio. Its programming simplicity and close approximation to ET without the complications and costs, the invention disclosed therein reduces the cost and has the potential to save more water and minimize run-off than previously available methods.

Notwithstanding the above it is presently believed that there is a long felt need for an improved water control system and method wherein water delivered to residences and businesses can be controlled by limiting consumption during a given period of time as for example a day. Further, the methods in accordance with the invention can be used to reduce consumption during periods of peak usage. It is also believed that there is a potential market for a system and methods for reducing the use of water.

It is presently believed that the systems and method for monitoring and controlling water distribution has a number of advantages. For example, systems and methods in accordance with the present invention provide a water supply based on a daily rate of consumption and one that will be respected in order to avoid a cut off of a customer's water. Further, the system charge an individual or organization only for the amount of water actually used and portion water based on a number of individuals in a household or on previous use by factories or other organizations. Such systems also eliminate the need for numerous employees to read water meters and facilitate collections by the use of Smart Cards. In addition, it is believed that the system in accordance with the present invention will increase the life span of the water distribution equipment and smooth out water pressure by reducing use during peak times for water usage. The system also allows a water company or ministry to control the daily and hourly rate and time of on/off supply to facilitate repairs and to readily increase or decrease the amount of water delivered to a customer based on changing conditions.

BRIEF SUMMARY OF THE INVENTION

In essence the present invention contemplates an electronic system for monitoring and controlling the use of water by a customer. The system includes a water inlet for receiving an amount of water from a water source, a water outlet for dispensing water from the water source for use by the customer and a control valve between the water inlet and the water outlet. Further, the system includes means such as a central computer for limiting the amount of water to be dispensed to a pre-selected customer during a pre-selected period of time, as for example, during a twenty-four hour period. A monitor is provided for indicating the amount of water used by the customer during that period of time and means for closing the control valve when the amount of water indicated by the monitor equals or exceeds the limited amount of water during the first period of time. At the expiration of the first period of time, the valve is re-opened automatically. In addition, the system includes means including the central computer for limiting the amount of water to be disbursed to a customer during a second pre-selected period of time, as for example, several hours per day during the periods of peak usage. Means are also provided for closing the control valve when the amount of water indicated by the monitor equals the limited amount of water during the second period of time and for opening the valve at the end of the second period of time. Finally, a smart card and means including the smart card are provided for overriding the aforementioned limitations. In a preferred embodiment of the invention, the system includes means for assessing penalties for water usage in excess of a limitation and for billing a customer for the amount of water used plus penalties. A further, embodiment of the invention contemplates a business management system with interaction between a central water supplier and a plurality of customers. The system comprises a interactive flow of information between a supplier and a plurality of customers to optimize the efficient use of water, water distribution and water consumption based on at least one of the following: a.) requested amount of water, b.) time of day, c.) history of prior usage, and d.) a smart card.

For accomplishing the above, the system includes means for monitoring a flow of water to a customer, means including a dispensing valve for controlling the flow of water to the customer and wherein the dispensing valve may be opened or closed based on at least one of the following: a.) the requested amount of water, b.) data on a smart card, c.) time of day, and d.) history of use.

Further, the invention contemplates a method for monitoring and controlling the use of water to optimize water distribution and water consumption. The method comprises the steps of: a.) providing a water counter, b.) a central computer and c.) means for communication between the water counter and the central computer. A further step in the method in accordance with the invention comprises establishing a flow of information between the water counter and the central counter, establishing a first limitation on the overall use of water by a first pre-selected period of time and enforcing the first limitation on the overall use of water by prevention the flow of water to a customer that exceeds the use as defined by the first limitation. The flow of water is then permitted after the expiration of the first period of time. In addition, the method includes the step of establishing a second limitation on the use of water during particular times of day and enforcing the second limitation on the use of water during particular time of day and preventing flow of water to pre-selected customers during the particular times of day. Finally, a smart card is provided for bypassing the limitations.

The invention will now be described in connection with the accompanying drawings wherein like numerals are used to designate like parts.

Figure 1:
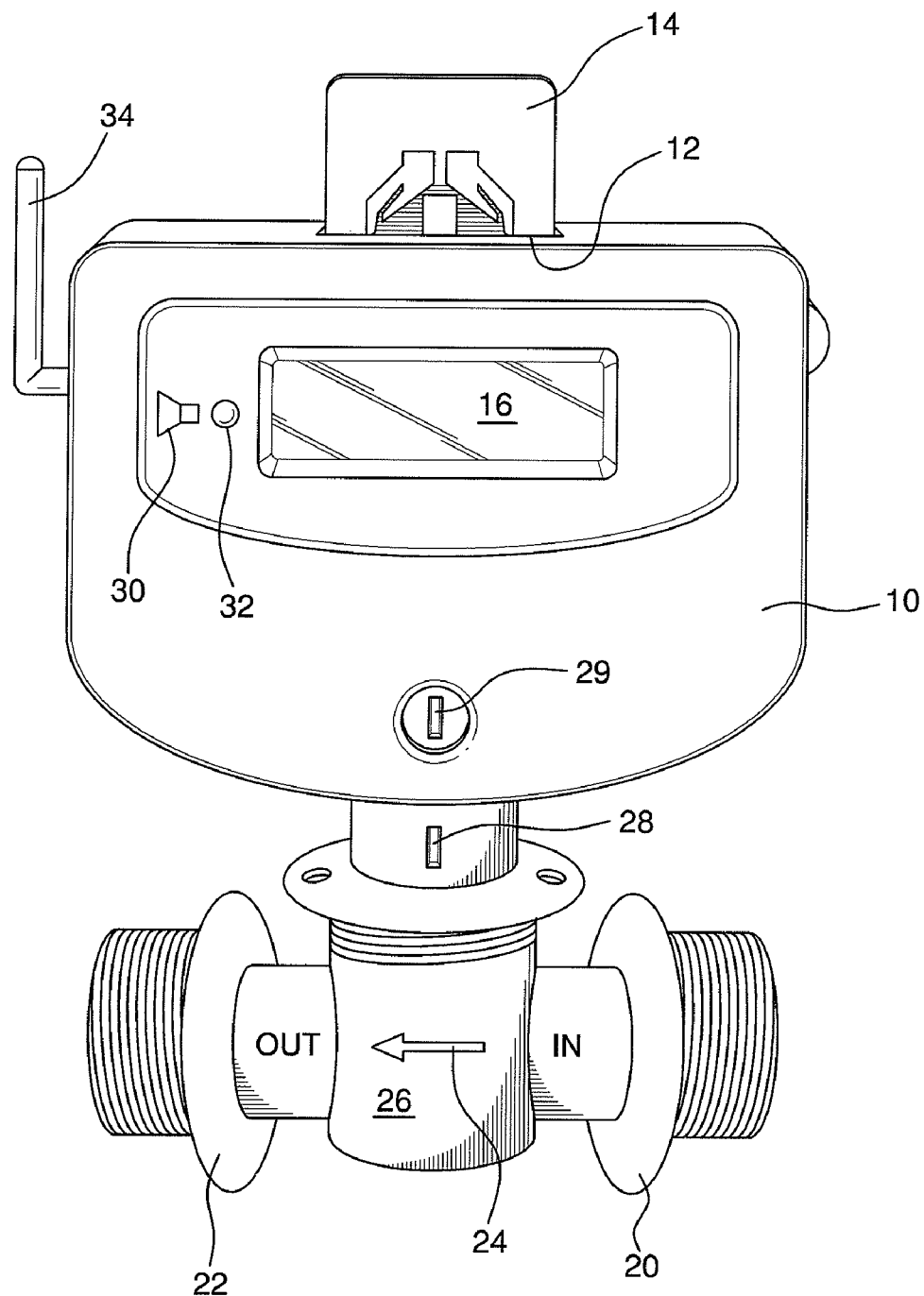
FIG. 1 is a schematic illustration showing various components of the invention.

DESCRIPTION OF THE PREFERRED
EMBODIMENTS OF THE INVENTION

An electronic system for monitoring and controlling the use of water by a consumer will now be described in connection with FIGS. 1-4. As shown, the system includes an electronic water counter 10 or meter which is basically of a conventional design. As illustrated the electronic water counter 10 includes a smart card receptacle 12 for receiving a smart card 14. The electronic counter 10 also includes a visual display 16 that typically indicates usage by a customer, but may be programmed to display time, current rate of change based on time of day and other useful information such as amount consumed per day and/or amount of water consumed during certain periods of peak usage.

The system in accordance with the present invention also includes a water inlet 20 for receiving water from a water source such as a water company, ministry of water, distribution center or the like. A water outlet 22 is also provided for distributing water to the consumer as for example, a residence or business and a valve 24 shown schematically as an arrow. The valve 24 is disposed within a housing 26 that contains a manifold as well as the valve 24. The manifold 26 contains the valve and a conventional flow meter (not shown) for indicating the amount of water delivered to the residence or business.

As shown in FIG. 1, the water counter 10 may be removed from the housing 26 by means of a key slot 28 or other conventional means. A key slot is shown since removal of the counter should be limited to authorized personnel. The water counter is removed for replacement of the counter or valve 24. A second key slot 26 may also be provided for access to the inner mechanism of the counter 10.

In a preferred embodiment of the invention, the water counter 10 also includes an audio alarm 30 to warn of a malfunction or as an indication that the consumer has reached a critical stage when the water may be turned off due to excess usage. In other cases the alarm may be used to warn a customer that they are approaching a period of peak usage during which time a drop in pressure may be experienced or a penalty may be assessed for usage during the period. A warning light 32 is also provided on the water counter 10 to warn of a low battery or other malady.

In addition to the above, the water counter 10 includes an antenna 34 for transmitting and receiving information to and from a central computer (not shown in FIG. 1). For example, the water counter can transmit the volume of water used during a predetermined period as for example a day and if the allowed value has been reached to close the valve 24. Then, when the next period begins the counter 10 either receives a signal from the central computer or automatically opens the valve 24 based on the time programmed.

The smart card 114 may be used for several purposes. For example, it can be used to receive and record consumption data daily, weekly or monthly, contain credit information, contain daily amounts of water not to be exceeded, periods when water may be turned off or delivered only at a premium charge etc.

Figure 2:
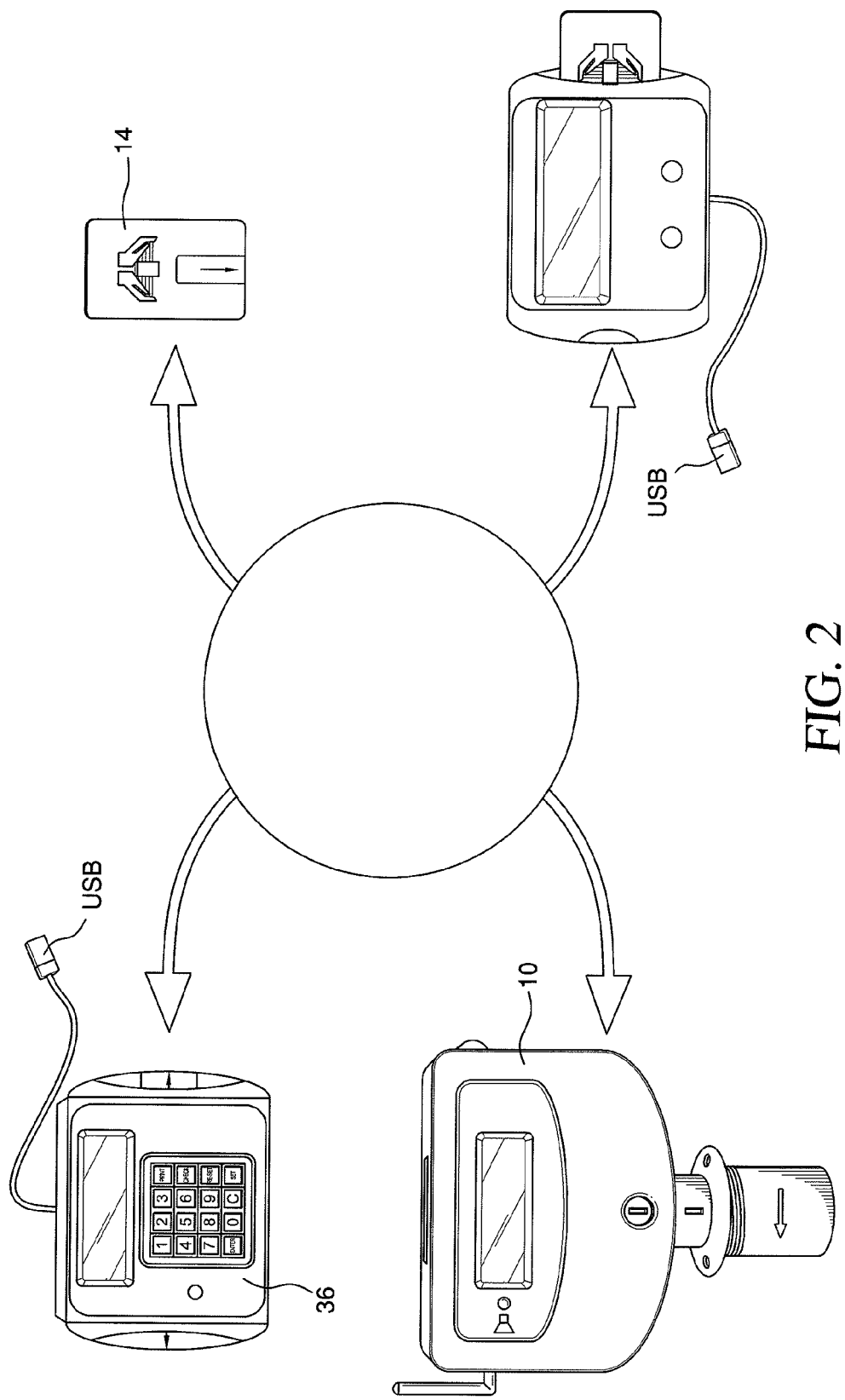
FIG. 2 is a schematic illustration of a first embodiment of the invention.
Figure 3:
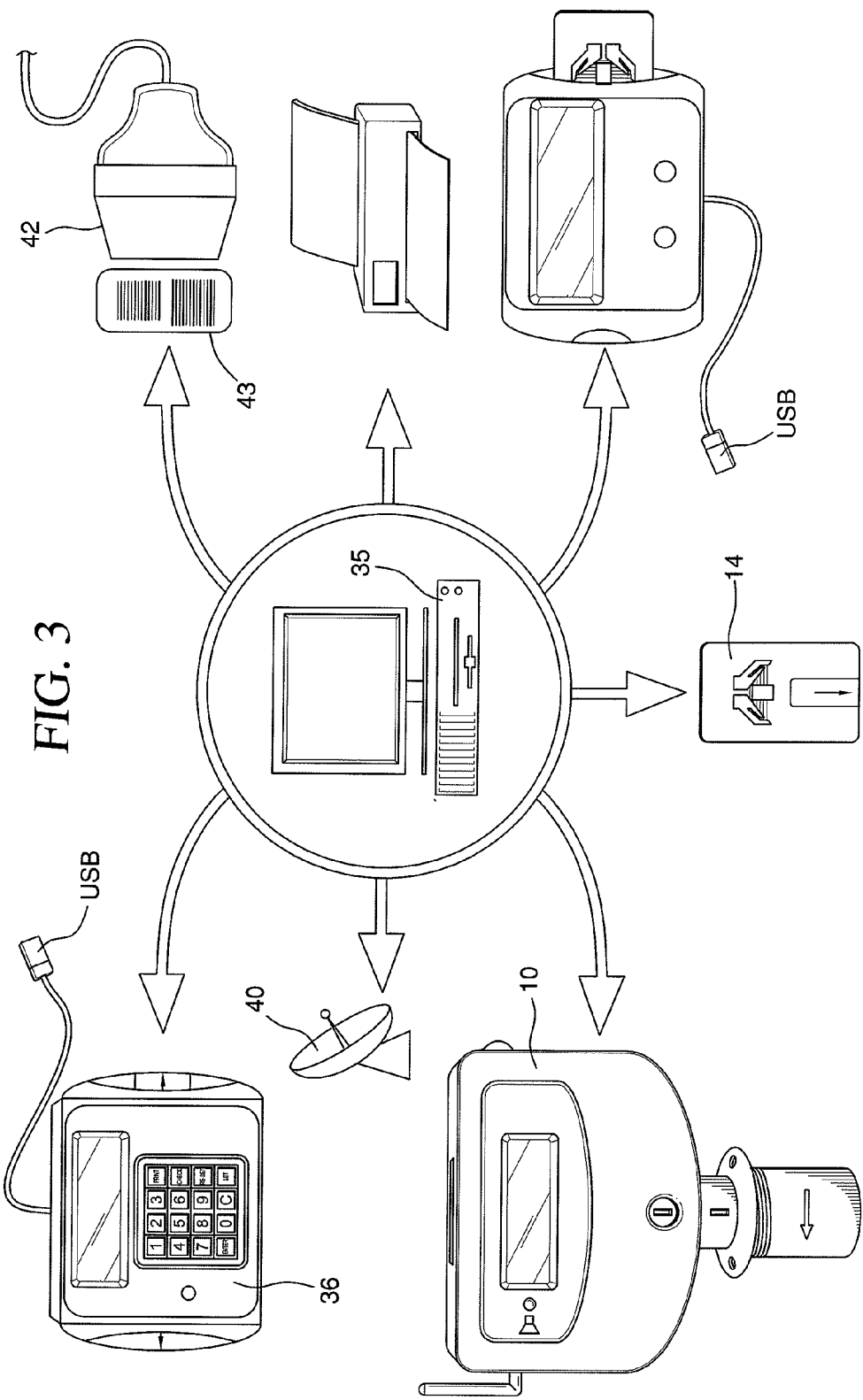
FIG. 3 is a schematic illustration of a system in accordance with one embodiment of the invention.

FIGS. 2 and 3 illustrate the system including water counter 10 for reducing the consumption of water by consumers. The system utilizes a central computer 35 which is constructed and arranged or programmed to transmit and receive information to and from the water counter 10 by wireless means by means of an arial 34 (FIG. 1). The central computer 35 is programmed by the water supply company or Government ministry. The central computer 35 is also operatively connected to a mobile control device 36 that is controlled by an employee of the water supplier that changes in an individual's water control can be made from the field. For example, if a leak developed in an individual's house or there was continued overuse by an individual, the employee could extend the periods of nonuse from the field, close the valve 24 (FIG. 1) or take other interim action as appropriate.

It should be recognized that in certain arid and semi-arid areas of the world, residences frequently include a water tank on their roof. In such cases, water can be pumped into the tank during off peak periods and then when the water is shut off for whatever reason there is sufficient water to provide for an emergency.

As shown in FIG. 3, the main or control computer 35 is maintained by the water company or in various countries by the ministry of water and is used to control or regulate the amount of water consumed by a plurality of customers such as residences, businesses, factories and the like. The control computer 35 is linked to the electronic water counter 10 by means of a satellite shown schematically such as a disk 40, wireless internet link or other conventional means. In addition, through consumption, the central computer receives information from the customer's Smart Card 14 that may provide customized regulation as for example exceptions to limitations during peak times or allow for additional amounts of water.

In a preferred embodiment of the invention, a barcode reader 42 is provided to read a barcode 43 attached to the back cover of the water counter 10 and includes the serial number of a counter 10, client's data which may be added to the client data maintained by the water supply company. At times of repair, the barcode is read and transmitted to the central computer 35. Finally, if data is lost or changed due to a repair the data provided by the barcode can be replaced onto the Smart Card 14. The barcode can also be used to input information and is tied into the water coolers so that the Smart Card 14 can be used with a single water counter.

Additional equipment utilized by the invention include a conventional printer for printing bills generated by the central computer 35 and data reader and copier all of which are operated in a conventional manner.

Figure 4:
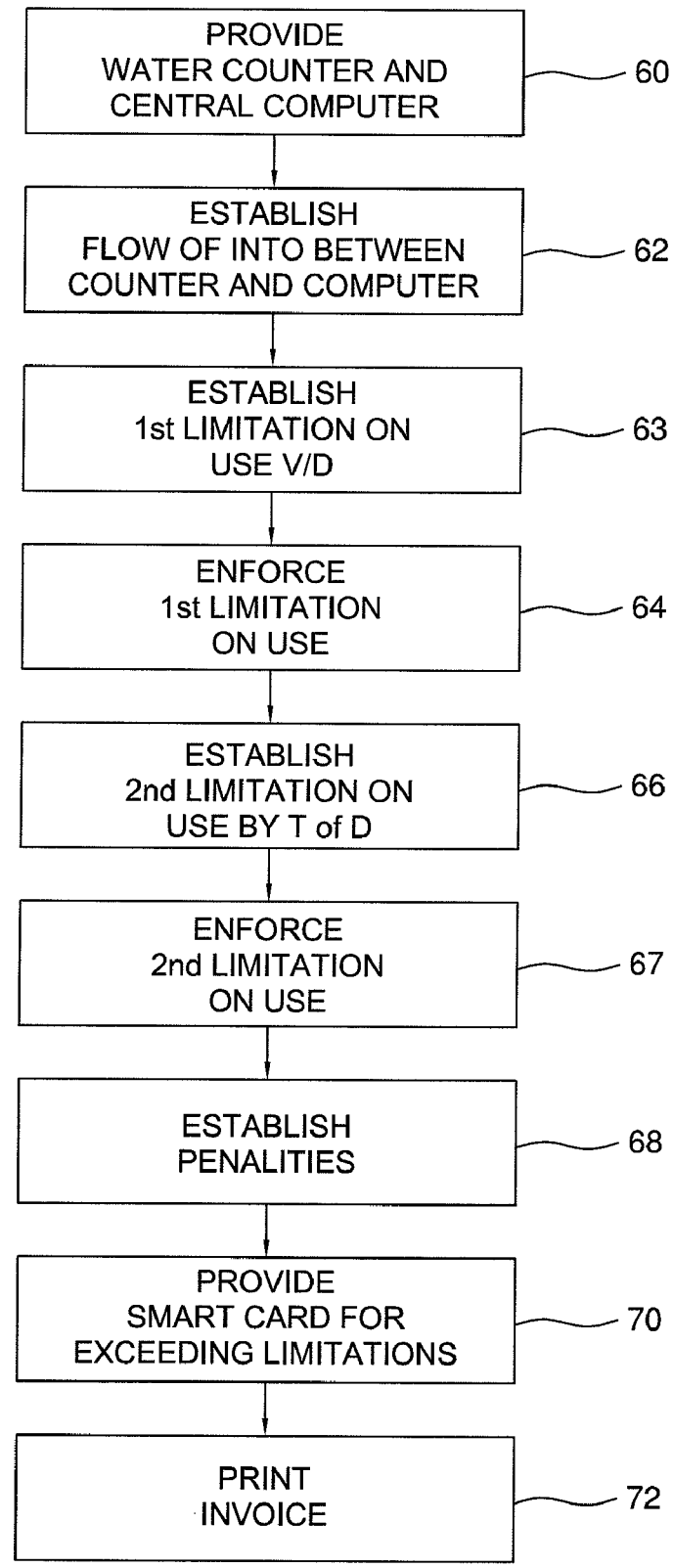
FIG. 4 is a flow chart illustrating a method in accordance with another embodiment of the invention.

A method for controlling and maintaining the use of water is illustrated in FIG. 4 wherein a water company provides each of the customers with an electronic water counter that is individually connected to the company's central computer which are linked together as for example over the internet in step 60. In a second step 62 a flow of information as for example water consumption is established such as the identification of a customer, daily water usage, rates of use at specific times etc. The method also includes a further step 63 wherein a first limitation such as gallons per day is established. The first limitation is enforced in step 64 by discontinuing the flow of water to a customer by sending a signal to close a valve in the electronic water counter.

In view of the fact that a customer can be subjected to an immediate stop in the water supply it is anticipated that several steps be taken to avoid problems with the reduction of water pressure. To begin, it is anticipated that each customer will have a reserve tank of perhaps 500 gallons of water on the roof of their dwelling and that gravity feed will provide water pressure to fill toilets, provide water for cooking etc. Other steps include an alarm to warn residents of an approaching cut off when a limitation of usage is approaching or if a battery failure is eminent.

In addition to the above, the method includes the step 66 of establishing a second limitation such as the prevention of water flow during peak periods of usage. This limitation may include different times of cut offs for different customers. For example, a first group of customers might be prevented from obtaining water from a company from 4:00 pm to 5:00 pm while another group is cut off from 5:00 pm to 6:00 pm and a further group from 6:00 pm to 7:00 pm. In the illustration one group might be deprived of water pressure from 4:00 to 7:00 pm on one day of the week, a second group on a second day of the week etc. As a third alternative the use of water during periods of peak usage could incur a premium rate or penalty.

After establishing the second limitation of usage based on the time of day, those limitations are enforced by discontinuing the flow of water in step 67. As for example, by closing the valve 24 as an alternative penalty or fines can be established in step 68 to discourage usage during peak periods. Fines may be sufficient to discourage use during those periods. Provisions may be programmed into the computer for an initial warning or an audio warning by the electronic water counter 10. After that the method includes a step 70 for providing storage on the Smart Card that will be transmitted to the central computer with instructions for indicating when the customer attempts to exceed the limitation. Finally, the method includes a step 72 for printing an invoice and delivering it to the customer for their use of water. It is also contemplated that in some cases there may be a discount provided to those customers that do not use the stipulated quantity of water.

The invention also contemplates a number of variations and modifications to the system and methods previously described. For example, the water counter may collect data and analyze previous data in order to program the water counter and determine the amounts and times of availability for different customers. The counters will then be installed as for example by an employee. The water company also provides each customer with a smart card as for example to provide an initial or security payment. The smart card is also programmed by the water company and based on payments made determines the amount and times that water will be deliverable and when the smart card needs to be updated.

The counter is installed by an employee of the water company and is set to run when activated by the customer's smart card. The counter and smart card each have matched barcodes so that only one counter will be activated by a single smart card and so that the smart card cannot be used with more than a single counter. It is also contemplated that the smart card can be recharged by an auto teller kiosk placed at various locations and that the card will divide the credit according to the program for each individual customer. Then the customer is allocated specific amounts of water to be provided according the programs.

Continuing data is sent to the water company and may be downloaded continuously or at specific times automatically. After downloading the counter may be reset for the next period of time. A backup for the central computer is also provided. The imports are also designed for changes in a customer's data as for example the increase or decrease in number of individuals at a given location.

In cases of emergency or maintenance a wireless signal may be used to discontinue water service for a period of time. At such times a warning signal will be given and maintained until the customer once again receives service.

Some of the benefits of the systems and methods disclosed herein are that there are no rush hour demands for paying bills or the like. Smart card can be recharged at different times and different places. Further there are no penalties for overuse as the client is not allowed to exceed the determined daily amounts. This is compensated as for example by a tank of water maintained on the roof of a dwelling. Further, the central computer receives only information from the counters about actual consumption and it only sends signals to reprogram the counter in cases of changes in the client's needs. The counter needs no man power to run it or even to check or the amounts of water being used. The authorities of employees to adjust the counter are limited while it is up to the client to provide their own tanks on the roof to store water during periods in which the water is cut off. At the end of the year, the client is charged according to actual consumption which may be less but not more than the determined amounts. If for example, the client uses less than his available consumption a credit may issue. In those cases where the client needs to increase the allotment they may visit or telephone the water company and make the appropriate changes in their data. The updated data will be analyzed and the counter reprogrammed by a wireless signal from the central computer.

While the invention has been disclosed in connection with its preferred embodiments it should be recognized that changes and modifications may be made therein without departing from the scope of the claims.

What is claimed is:

1. An electronic system for monitoring and controlling the use of water by a customer, said system comprising:

a water inlet for receiving an amount of water from a water source;

a water outlet for supplying water from said water inlet to a customer and a control valve including a flow meter between said water inlet and said water outlet;

means including a vertical component for limiting the amount of water to be dispensed to a pre-selected customer during a first pre-selected period of time;

a monitor for indicating the amount of water used by the pre-selected customer during the first pre-selected period of time;

means for closing said control valve when the amount of water indicated by the monitor exceeds the limited amount of water during a first period of time and for opening the control valve when the first period of time has elapsed;

a water tank into which water can be pumped into said tank during off peak periods and then when water is shut off, there is sufficient water to provide for an emergency;

means including the central computer for limiting the amount of water to be dispersed to a customer during a second pre-selected scheduled period of time;

means for closing said central valve when the amount of water indicated by the monitor equals the limited amount of water during the second period of time and for opening the central valve when the said period of time has lapsed;

a smart card and means including the smart card for overriding the limitation and means which includes means including an aerial for providing wireless communication between the water counter and the central computer; and wherein the smart card and control valve have matching barcodes so that a single smart card will activate only a single control valve.

2. An electronic system for monitoring and controlling the use of water by a customer according to claim 1 which includes a crystal monitor and electronic actuated valve for indicating water usage during various time periods and for opening and closing the valve.

3. An electronic system for monitoring and controlling the use of water by a customer according to claim 2 which includes an alarm that warns a customer that they are approaching one of the limitation and a battery and a warning light provided on the water counter to warn of a low battery or other malady.

4. An electronic system for monitoring and controlling the use of water by a customer according to claim 3 which includes two portions, namely an upper portion including the mechanism for monitoring the value of water and different periods of time and for communicating with the central computer and a lower portion includes the control valve inlet and outlet and wherein the upper portion is removable from the lower portion and a key slot for removal of the counter.

5. An electronic system for monitoring and controlling the use of water by a customer according to claim 4 which includes a mobile control device for operation by an employee of a supplier to provide new or modified limitations.

6. An electronic system for monitoring and controlling the use of water by a customer according to claim 4 in which the first pre-selected period of time is twenty-four hours.

7. An electronic system for monitoring and controlling the use of water by a customer according to claim 6 in which the smart card authorizes an additional volume of water at an increased charge.

* * * * *